UNITED STATES PATENT OFFICE.

GEORG EDUARD HEYL, OF CHARLOTTENBURG, PRUSSIA, GERMANY.

METHOD OF MAKING ELECTRODES FOR SECONDARY BATTERIES.

SPECIFICATION forming part of Letters Patent No. 426,724, dated April 29, 1890.

Application filed June 8, 1889. Serial No. 313,609. (No model.)

*To all whom it may concern:*

Be it known that I, GEORG EDUARD HEYL, a subject of the King of Prussia and the Emperor of Germany, residing at Charlottenburg, Prussia, Germany, have invented certain new and useful Improvements in the Method of Making Secondary Batteries, of which the following is a specification.

This invention relates particularly to the method of making the porous plates constituting the electrodes of secondary batteries, and has for its object to increase the efficiency of the battery in proportion to its weight and to remedy some of the defects of secondary batteries as now made.

Heretofore the electrodes of secondary batteries have been made of porous plates of more or less finely-divided lead. The latter is used in the form of powder, sponge, strips, foils, or dust. All these forms of lead possess the disadvantage that the surfaces of the particles are so closely compacted by the pressure required in forming the plates that they oppose a great resistance to the circulation of the electrolytic fluid. During the action small particles of lead separate from the rest and form short circuits, which defect can be avoided only by the use of inconvenient envelopes, which impair the efficiency of the battery. Electrodes have also been made of lead felt, which possesses a much greater active surface for the same weight than other lead preparations, since the lead felt, in spite of the heavy pressure used in forming the plates, is not compressed to a compact mass, but remains much more porous than any of the other lead preparations heretofore used, whereby the electrolyte circulates more freely and the efficiency is increased. As hitherto made, however, the lead-felt plates have been made up of short threads of lead felted together and united together only by the felting process and possess certain inherent disadvantages. When the oxidation sets in, the short lengths of wire fall off one after the other, until finally there remains nothing but the frame and a few threads soldered thereto. The plates thus formed are therefore short-lived, and in any case are imperfect, since there is no electric continuity therein, and the loss of a few threads renders the circuit defective.

The present invention relates to lead-felt plates of the general character described; and it consists in an improved construction whereby the enumerated defects are overcome.

In carrying out my invention I prepare a number of lead-felt cakes or plates by hanging up vertically thin round wires or threads of lead, which have the same weight for each plate, and then entangling and intertwining or felting them by directing against them several streams of compressed air simultaneously in different directions. When the lead threads are sufficiently felted, they are suddenly dropped to the ground, forming a spongy heap of loose felt, which is compressed in a suitable mold by any suitable compressing apparatus, so as to furnish a coherent cake or plate of lead felt about one-fourth to one-half of an inch thick, three to six inches wide, and six inches or more long. A number of these plates are then placed flatwise into a suitable mold in such manner that a marginal space of one-fourth to three-eighths of an inch wide is left all around and between the different plates. After having moistened the edges of the plates with soldering-fluid melted lead is poured into the mold, whereby the edges of the felt cakes are soldered to the setting lead. In this way all the felt plates are firmly united with each other and with the frame and trellis work by soldering, securing an absolute electric contact and complete transmission of the electric current. As the lead threads of the plates are felted and also compressed, no short ends or particles can drop down. The round threads crossing each other in every direction and completely intertwined and felted cannot be compressed to a compact mass, but retain the original interstices, holes, or passages, although these are decreased in size by the pressure. The plates being composed of comparatively long threads, the greater number thereof are directly connected by the solder to the frame or trellis work, and hence there is no danger of their falling away. The threads which are not themselves soldered are nevertheless so thoroughly intertwined among the others that there is no danger of their falling off.

The effectiveness of the new electrode is considerably greater than hitherto attained, as the electrolytic fluid can freely circulate through the lead felt and the security of working is absolute.

Having thus described my invention, what I claim, and desire to secure by Letters Patent, is—

The herein-described method of making the electrodes of secondary batteries, which consists in suspending vertically a number of wires or threads of lead, then simultaneously directing against said suspended wires or threads a plurality of streams or currents of air in different directions, whereby the wires or threads are intertwined and entangled, and then subsequently compressing the intertwined and entangled wires or threads, substantially as set forth.

This specification signed by me this 2d day of April, 1889.

GEORG EDUARD HEYL.

Witnesses:
CARL T. BURCHARDT,
CHAPMAN COLEMAN.